No. 773,540. PATENTED NOV. 1, 1904.
C. N. BROWN.
LOCKING DEVICE FOR BROOCH CATCHES.
APPLICATION FILED APR. 15, 1902.
NO MODEL.

Witnesses.
C. H. Gannett.
J. Murphy.

Inventor.
Charles N. Brown
by Jas. H. Churchill
Atty.

No. 773,540. Patented November 1, 1904.

UNITED STATES PATENT OFFICE.

CHARLES N. BROWN, OF WALTHAM, MASSACHUSETTS, ASSIGNOR TO JOHN A. ABEL AND EDWARD C. ABEL, OF NEW YORK, N. Y.

LOCKING DEVICE FOR BROOCH-CATCHES.

SPECIFICATION forming part of Letters Patent No. 773,540, dated November 1, 1904.

Application filed April 15, 1902. Serial No. 103,015. (No model.)

*To all whom it may concern:*

Be it known that I, CHARLES N. BROWN, a citizen of the United States, residing in Waltham, in the county of Middlesex and State of Massachusetts, have invented an Improvement in Locking Devices for Brooch-Catches, of which the following description, in connection with the accompanying drawings, is a specification, like letters on the drawings representing like parts.

This invention relates to a catch or hook, and has for its object to provide the same with a locking device which is automatically operated to close the slot or opening leading to the catch or hook.

The invention, among other uses, is especially adapted for use on brooches, pins, and like devices, whereby the pin of the brooch is automatically locked in its hook or catch when moved into its closed position. These and other features of this invention will be pointed out in the claim at the end of this specification.

Figure 1:
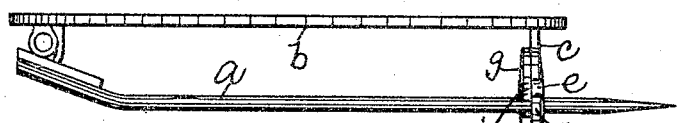
Figure 2:
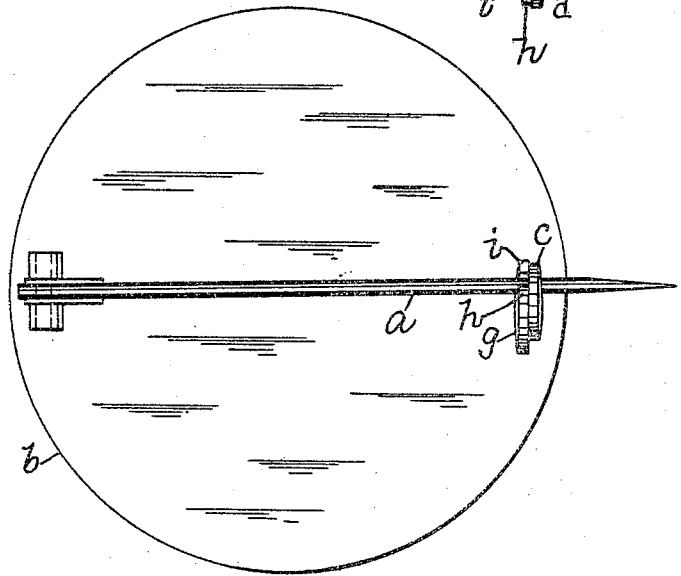
Figure 3:
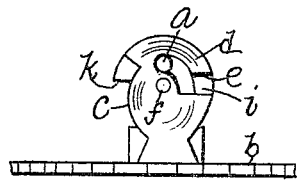
Figure 4:
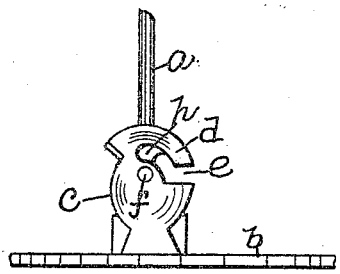
Figure 5:
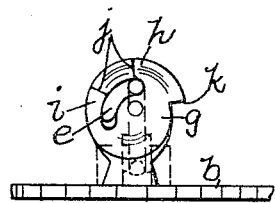

Figure 1 is a side elevation of a brooch embodying this invention; Fig. 2, an inverted plan of the brooch shown in Fig. 1. Fig. 3 is an elevation of the brooch shown in Fig. 2 looking toward the left, showing the parts in the position they occupy when the pin is locked; Fig. 4, a like elevation showing the parts in their normal position with the pin removed; Fig. 5, a detail in elevation looking from the opposite side of the catch with the parts in the position they occupy in Fig. 3, and Fig. 6 a detail in elevation looking from the opposite side of the catch with the parts in the position they occupy in Fig. 4.

The pin $a$, pivoted at its rear end to the brooch $b$, and the catch plate or bar $c$, provided with the hook or catch $d$, formed by the slot $e$, may be of any suitable or usual construction.

In accordance with this invention the catch plate or bar $c$ has rotatably secured to it, as by the pivot or shaft $f$, a locking device which is engaged by the pin $a$ and automatically moved thereby to close the mouth of the slot $e$.

Figure 6:
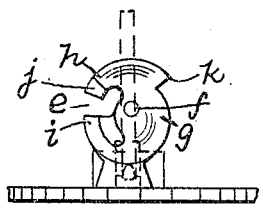

The locking device may be made as herein shown, and consists of a plate or disk $g$, mounted on the shaft or pivot $f$ and provided with an arm or projecting portion $h$ and with a second arm or finger $i$, separated from the arm $h$ by an opening $j$, which registers with the slot $e$ when the locking device is in the position shown in Figs. 4 and 6, and when said locking device is in this position the pin $a$ is free to be passed through the straight portion of the slot $e$ into the curved portion thereof.

The arm $h$ is adapted to be engaged by the pin $a$ when the latter is inserted in the slot of the catch and is moved by said pin until the said arm is substantially flush with the end of the slot in the catch, at which time the finger $i$ will have been moved so as to close the slot in the catch, and thus lock the pin in its catch until released, which may be effected by means of a projection $k$ on the back or rear side of the plate or disk $g$.

The catch plate or bar and the locking plate or disk may be slightly dished or concaved at their center, as represented in Figs. 1 and 2.

The operation of the safety hook or catch may be readily understood by reference to Figs. 3 to 6, inclusive.

Referring to Fig. 4, the pin $a$ is shown in its open position, as is also the locking device. In closing the pin the latter is passed laterally into the slot $e$ and then upward therein. During the movement of the pin in the slot it engages the arms $h$ of the locking device and turns the latter on its pivot, which rotary movement of the locking device carries the finger $i$ across the mouth of the slot $e$ and closes the same, thereby securely locking the pin $a$ in its catch or hook, as represented in Figs. 3 and 5.

It is to be noted that in case the locking device should accidentally be turned by the shoulder $k$ catching in the clothing, so as to move the finger $i$ and uncover the slot $e$, the pin $a$ would still be retained in its closed position by the hook $d$ on the catch plate or bar after the manner of the ordinary catch.

The hook or catch with the locking device for automatically closing the slot in it may be used in other places and devices without the pin—as, for instance, the hook and lock- -ing device may be used as a support for ladies' watches worn on the outside of the waist.

I claim—

In a catch, in combination, a plate having an irregular slot comprising a straight portion extended inward from the edge of the plate and a curved portion extended from said straight portion and forming the hook $d$, a locking device pivoted to the said plate and comprising a disk provided with an arm or projection $h$ and a second arm or finger $i$ separated from the arm $h$ by an opening $j$ adapted to register with the straight portion of the slot in the said plate, substantially as described.

In testimony whereof I have signed my name to this specification in the presence of two subscribing witnesses.

CHARLES N. BROWN.

Witnesses:
Jas. H. Churchill,
J. Murphy.